May 16, 1967 M. J. LAFONT 3,320,391

BLANK FOR SELECTOR SWITCH

Filed June 7, 1965

Michel Jean Lafont
INVENTOR.

BY Michael P. Breston

ATTORNEY 3,320,391
Patented May 16, 1967

3,320,391

BLANK FOR SELECTOR SWITCH

Michel Jean Lafont, Saint-Maur, France, assignor to Societe d'Instrumentation Schlumberger, Paris, France, a corporation of France Filed June 7, 1965, Ser. No. 462,032
Claims priority, application France, June 10, 1964, 977,811
4 Claims. (Cl. 200—166)

This invention relates to friction operated switches and, more particularly, to such switches incorporating a printed track. The advantages of printed tracks in friction operated switches are well known. For example, a large number of contacts can be provided in a relatively small space. In the case of rotary switches, the angular position of the contacts can be determined with higher accuracy. In order to make a switch operating under a compound law of operation, it is sufficient to provide on the pins of a connector, associated with the switch, a suitable number of short circuits. While this method of making switches to operate under a compound law is feasible, yet in the case of switches including printed tracks, this method is difficult to carry out. Especially difficult is the wiring of the switch which increases the time required for connecting the switch to other components in a system.

It has been attempted to avoid the above drawbacks by producing tracks which provide directly the desired law of combination. In this case, however, a special printed track is required for each law governing the switches. Obviously, in the case where it is desired to satisfy combination laws of various types, it is necessary to provide a large number of special tracks which are possibly modified by means of external short circuits produced across the pins of the associated connector. Because the plates from which the tracks are obtained are relatively expensive, it is desirable to obtain from each plate an optimum number of tracks. Also, it is economically advantageous to reduce the number of required standard plates or stereoplates.

The objects of this invention are to provide a method for making printed tracks of a standard type from which it is possible to obtain laws of combinations as complex as desired, yet without increasing the wiring to the plates through the pins of the associated connectors.

In accordance with this invention, there is provided a method for making a special printed track which allows the formation, in association with a slider of a suitable width, of a friction operated electric switch of which the law of combinations for the contacts may be selected from a series of N possible laws. The printed track includes uniformly distributed contact pieces of one line and, to one side of said line, connections are made between the contact pieces and the pins of a connector.

This method is characterized by the fact that during a first stage a standard printed track is executed on which the different contact pieces are connected with a common collector positioned on the opposite side of said line. The contact pieces are separated from one another by insulating parts of which the width in the areas over which the slider moves is less than the width of said slider while the length of such parts may assume N different values. The law governing the lengths of the successive paths defining the series of N laws of normal combinations which it is desired to obtain while, during a second stage, there is provided through a suitable machining, a separation between the contact pieces and the common collector, the machining being performed in registry with one of the N steps in the lengths of said paths in a manner such that, during a single operation, said standard track is transformed into said special track.

A standard printed track, according to the invention which is to form part of a switch having N possible laws of normal combinations, which laws are numbered on the one hand from 1 to N according to the machining which is to provide them is performed in registry with the corresponding step numbered 1 to N and show, on the other hand, a series of combinations of which the number, when passing from a law of a predetermined rank, to the law corresponding to the next rank, increases in accordance with a geometrical progression, the ratio of which is equal to two, is characterized by the fact that the connections between the contact pieces and the common collector are grouped in anumber of bundles equal to the number of combinations of rank 1 law and in each bundle, the number of insulating paths including a step $n^o\ n$ $(1 \leqslant n \leqslant N)$ is equal to $2^n$, said paths being uniformly distributed in said bundle as a function of their lengths.

Through this arrangement, it is possible, by executing a standard printed track of a circular shape, to transform through a single cut of the lathe, said standard track into a special track the combination of the contact pieces of which provides a number of contact pieces which increases or decreases between a simple number and its double, according to the step in registry with which said cut is executed.

The features and advantages of the invention will appear in a more accurate manner from the following description given solely by way of example and in a non limiting sense, reference being made to the accompanying drawings wherein.

Figures 1, 2:
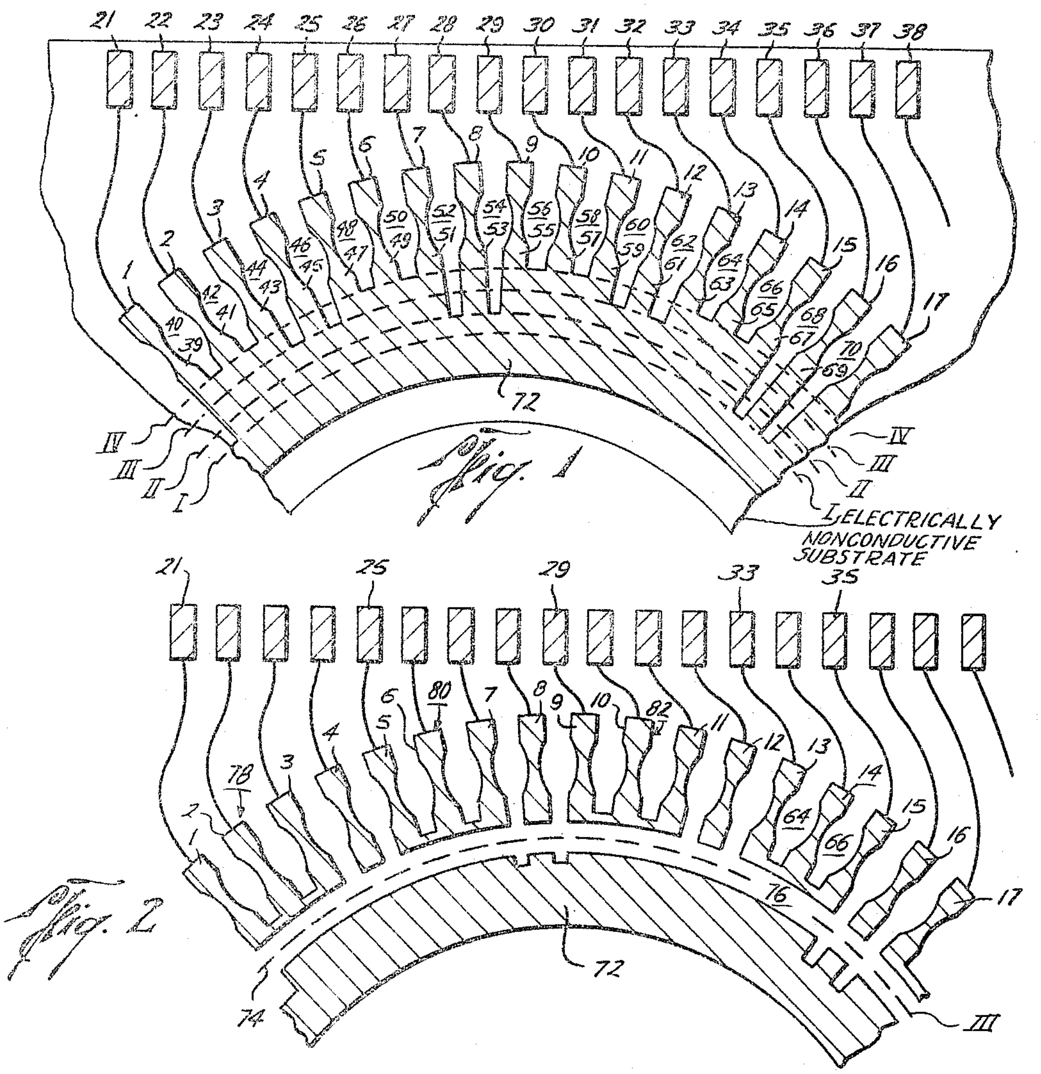
FIG. 1 illustrates a fraction of a standard printed track assuming a circular shape.
FIG. 2 illustrates a fraction of a special track.

As illustrated in FIG. 1, a series of contact pieces are numbered from 1 to 16 and the separations between them are executed in accordance with a predetermined cyclic law to be defined hereinafter. The contact piece 17 is a homologue of the contact piece 1 in a further series of contact pieces. The different jacks of a connector are numbered from 21 to 36 and are connected respectively with the contact pieces 1 to 16 through connections which are illustrated but carry no reference numbers.

Even numerals from 40 to 70 form the references of the separating paths established between the connections carrying as reference numbers the odd numerals 39 to 69 and connecting the contact pieces 1 to 17 with the common collector 72.

The separating channels 40 to 70 are of lengths which may assume four different values: four reference levels I–II–III–IV exist thus in such paths, said levels being spaced with reference to each other by one step. The step terminating at a predetermined level carries the same reference number as said level. Thus, the last step in the separating paths 68 and 70 carries the reference number I and the last step of the separating paths 44 and 46 carries the reference number III. The number of paths including a step at the level I is equal to two as shown at 68 and 70. The number of paths including a step corresponding to level II, is equal to four, to wit the preceding steps and in addition thereto 52 and 54. The number of paths including a step corresponding to level III is equal to eight to wit the four preceding steps with the addition of 44, 46, 60 and 62. The number of paths including a step corresponding to level IV, is equal to sixteen, so that all the paths 40 to 70 form part of said series of paths.

As illustrated in FIG. 2 which shows a special track obtained starting from the standard track according to FIG. 1, a cut of the lathe 74 is executed at the level III.

By means of a cutter, there is also provided at the root of the contact piece 14, a cut 76 which extends through levels III and IV and opens into the insulating paths 64, 66 and 74.

The connector associated with the special track of which a fraction is illustrated in FIG. 2, has its contact pieces 21, 25, 29, 33 and 35 connected with leads which are not illustrated and in contradistinction all the other contact pieces of the series 21 to 37 are unconnected.

Figure 3:
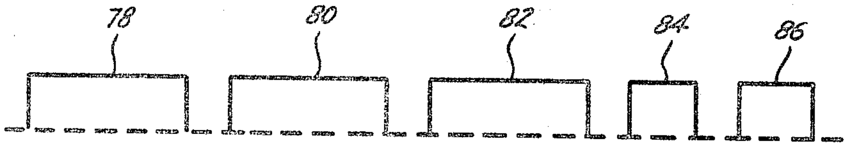
FIG. 3 illustrates the law of combinations of the contact pieces obtained with the fraction of a special track illustrated in FIG. 2.

In FIG. 3, is illustrated symbolically the switching law obtained by shifting over the fraction of track, according to FIG. 2, a slider the breadth of which is equal to ⅓ of the space separating successive contact pieces and establishing an electric connection between the contact pieces 1 to 16 and the common collector 72.

As the slider rotates, there are formed on the jacks 21, 25, 29, 33, 35 the signals 78, 80, 82, 84, 86.

Examination of FIG. 2 shows that, by resorting to a single cut of the lathe 74, it is possible to transform a standard track into a special track of which the law of combinations of the contact pieces would have required a complete series of short circuits for the jacks of the connector associated with said track.

A law of irregular combinations has been obtained by means of the cut 76 (see FIG. 3). Said modification shows that the complexity of the laws of combinations may be increased as required, by resorting to a particularly simple action.

By executing a lathe cut 74 at the level II, this would lead to a division by two of the number of independent contact pieces obtained on the special track. In contradistinction, by executing a cut 74 at the level IV, this would have multiplied by two the number of independent available contact pieces. In this latter case (a cut by the lathe at the level IV), it is possible either to leave all even-numbered jacks of the series 21 to 37 free, or in contradistinction to connect them with a lead. In the case where said jacks are free, there are then available, for the fraction of track which is illustrated, eight contact pieces (the reference numbers of which are the odd numbers ranging from 1 to 16) and which are perfectly independent of each other, in other words, without a short circuit being possibly established between them at the moment of the passage of the slider from one contact piece onto another. In contradistinction, if the even-numbered jacks of the connector are also connected with outer leads, the passage of the slider from an even-numbered contact piece onto an odd-numbered contact piece or reversely, produces a short circuit between two leads of successive numbers.

The invention is obviously not limited to the embodiment which has been described hereinabove and, in contradistinction, it may form the object of various modifications. Thus, for instance, the number of steps I, II, III, IV executed on the track may be increased or reduced. Thus also, the shape of the separating paths 40 to 70 may vary, provided their length is not modified.

On the other hand, instead of resorting to a geometrical progression having as a ratio 2 to form the number of combinations for the different laws which are obtained by providing in succession a machining at levels ranks rising from 1 to N, it is possible of course, to resort to a geometrical progression having a ratio equal to 3. In such a case, the number of insulating paths including a step of a row $n$ (with $1 \leqslant n \leqslant N$) would be equal to $3^n$, said paths being uniformly distributed in each bundle of connections established between the contact pieces and the common collector, as in the case of the above-described track.

As to the number of bundles executed on a track, it depends on the length of the line along which the contact pieces are distributed and on the breadth of said contact pieces. Said number is generally equal to 2 or to 3 or to a multiple of said two numerals in the range of numerals lying between 2 and 12.

It is possible, in particular cases, to use a rectilinear track instead of a circular track.

What is claimed is:

1. A blank for use in manufacturing the fixed contact members of a selector switch comprising an electrically conductive strip having first and second parallel longitudinal edges and a plurality of electrically nonconductive paths contained within the boundaries of said strip extending inwardly from the second of said longitudinal edges thereof generally transversely of said strip and toward the other of said edges, said nonconductive paths each terminating at one of a plurality of N distances from the second of said edges, said N distances defining N reference levels in said strip, each of said N distances being less than the total width of said strip.

2. As an article of manufacture, a blank from which the fixed contact portions of a selector switch can be produced by a single cutting operation, the contacts of the final switch having one of a plurality of N possible spatial relationships, said article comprising an electrically nonconductive substrate;

an electrically conductive strip secured to one face of said substrate, the longitudinal edges of said strip defined by first and second parallel lines, the portion of said conductive strip adjacent the first one of said lines being continuous, the portion of said conductive strip adjacent the second of said lines being interrupted by a plurality of nonconductive paths extending inwardly from said second line forming a plurality of conductive outwardly extending fingers, each said nonconductive path extending inwardly to one of N possible distances from said second line, said strip being convertible into a fixed contact arrangement including a continuous collector contact and a plurality of spaced contact members by removing a relatively narrow band of said contact material along a third line parallel with said two lines and spaced from said second line by a distance $n$, where $1 \leqslant n \leqslant N$.

3. A blank convertible by a single machining operation into the fixed contact members of a selector switch, the fixed contact members having one of N possible combinations of contact relationships, said blank comprising an electrically conductive strip having first and second parallel longitudinal edges, the portion of said conductive strip adjacent the first one of said edges being interrupted by a plurality of electrically nonconductive paths extending inwardly from said first edge forming a plurality of outwardly extending fingers, each said nonconductive path terminating at one of N preselected distances from said first edge, the numbers of paths terminating at each distance being in geometric progression having a fixed ratio.

4. A blank according to claim 3 wherein the ratio of said geometric progression is 2.

References Cited by the Examiner

UNITED STATES PATENTS 3,033,914 5/1962 Acosta-Lleras ------ 174—68.5

ROBERT K. SCHAEFER, *Primary Examiner.*

H. O. JONES, *Assistant Examiner.*